(12) United States Patent
Fang et al.

(10) Patent No.: US 10,190,191 B2
(45) Date of Patent: *Jan. 29, 2019

(54) PRODUCING A TITANIUM PRODUCT

(71) Applicant: University of Utah Research Foundation, Salt Lake City, UT (US)

(72) Inventors: Zhigang Zak Fang, Salt Lake City, UT (US); Peng Fan, Salt Lake City, UT (US); Scott Middlemas, Salt Lake City, UT (US); Jun Guo, Salt Lake City, UT (US); Ying Zhang, Salt Lake City, UT (US); Michael Free, Salt Lake City, UT (US); Amarchand Sathyapalan, Salt Lake City, UT (US); Yang Xia, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 280 days.

This patent is subject to a terminal disclaimer.

(21) Appl. No.: 14/912,846

(22) PCT Filed: Aug. 19, 2014

(86) PCT No.: PCT/US2014/051621
§ 371 (c)(1),
(2) Date: Feb. 18, 2016

(87) PCT Pub. No.: WO2015/050637
PCT Pub. Date: Apr. 9, 2015

(65) Prior Publication Data
US 2016/0194733 A1    Jul. 7, 2016

Related U.S. Application Data

(60) Provisional application No. 61/867,467, filed on Aug. 19, 2013.

(51) Int. Cl.
*C22B 7/04* (2006.01)
*C01B 6/02* (2006.01)
(Continued)

(52) U.S. Cl.
CPC .................. *C22B 7/04* (2013.01); *B22F 9/20* (2013.01); *C01B 6/02* (2013.01); *C22B 1/02* (2013.01);
(Continued)

(58) Field of Classification Search
None
See application file for complete search history.

(56) References Cited

U.S. PATENT DOCUMENTS 2,205,854 A    6/1940    Kroll
2,427,338 A    9/1947    Alexander
(Continued)

FOREIGN PATENT DOCUMENTS

CN    101497945 A    8/2009
DE    974210 C    10/1960
(Continued)

OTHER PUBLICATIONS

Xue, T. et al., "Decomposition Kinetics of Titanium Slag in Sodium Hydroxide System", Hydrometallurgy, vol. 95, pp. 22-27, available online Apr. 12, 2008.*
(Continued)

*Primary Examiner* — George Wyszomierski
(74) *Attorney, Agent, or Firm* — Thorpe North & Western, LLP

(57) ABSTRACT

A method (400) for producing a titanium product is disclosed. The method (400) can include obtaining $TiO_2$-slag (401), and producing a titanium product from the $TiO_2$-slag using a metallic reducing agent (402) at a moderate temperature and a pressure to directly produce a titanium
(Continued)

product chemically separated from metal impurities in the TiO$_2$ slag (403). The titanium product can comprise TiH$_2$ and optionally elemental titanium. Impurities in the titanium product can then removed (404) by leaching, purifying and separation to form a purified titanium product.

11 Claims, 9 Drawing Sheets

(51) Int. Cl.
  *C22B 34/12* (2006.01)
  *C22B 3/04* (2006.01)
  *B22F 9/20* (2006.01)
  *C22B 1/02* (2006.01)

(52) U.S. Cl.
  CPC ............ *C22B 3/04* (2013.01); *C22B 34/1204* (2013.01); *C22B 34/1213* (2013.01); *C22B 34/1259* (2013.01); *C22B 34/1268* (2013.01); *C22B 34/1277* (2013.01); *C22B 34/1286* (2013.01); *C22B 34/1295* (2013.01); *B22F 2201/013* (2013.01); *B22F 2301/205* (2013.01)

(56) References Cited

U.S. PATENT DOCUMENTS

| | | | |
|---|---|---|---|
| 2,773,787 A | 12/1956 | Rick | |
| 2,804,375 A | 8/1957 | Kamlet | |
| 2,850,379 A | 9/1958 | Hawkes | |
| 2,984,560 A | 5/1961 | Dombrowski | |
| 3,140,170 A | 7/1964 | Henrie et al. | |
| 3,472,648 A | 10/1969 | Suriani | |
| 3,721,549 A | 3/1973 | Gallay et al. | |
| 3,903,239 A | 9/1975 | Berkovich | |
| 4,923,531 A | 5/1990 | Fisher | |
| 5,211,775 A | 5/1993 | Fisher et al. | |
| 5,460,642 A | 10/1995 | Leland | |
| 5,503,655 A | 4/1996 | Joseph | |
| 5,779,761 A | 7/1998 | Armstrong et al. | |
| 5,830,420 A | 11/1998 | Borowiec et al. | |
| 6,152,982 A | 11/2000 | Froes et al. | |
| 6,168,644 B1 * | 1/2001 | Fukasawa | B22F 9/023 423/645 |
| 6,231,636 B1 | 5/2001 | Froes et al. | |
| 6,264,719 B1 | 7/2001 | Zhang et al. | |
| 7,559,969 B2 | 7/2009 | Sanjuijo et al. | |
| 7,585,457 B2 | 9/2009 | Zhang et al. | |
| 8,007,562 B2 | 8/2011 | Kasparov et al. | |
| 8,092,570 B2 | 1/2012 | Boulos et al. | |
| 8,328,899 B2 | 12/2012 | Adam et al. | |
| 8,388,727 B2 | 3/2013 | Klevtsov et al. | |
| 8,845,998 B2 | 9/2014 | Ishikawa | |
| 8,871,303 B2 | 10/2014 | Han et al. | |
| 9,067,264 B2 | 6/2015 | Moxson et al. | |
| 2001/0007646 A1 | 7/2001 | Lakshmanan et al. | |
| 2004/0103751 A1 | 6/2004 | Joseph et al. | |
| 2004/0194574 A1 * | 10/2004 | Cardarelli | C25C 3/00 205/398 |
| 2005/0166706 A1 | 8/2005 | Withers et al. | |
| 2006/0011273 A1 | 1/2006 | Zhang et al. | |
| 2006/0174727 A1 | 8/2006 | Bick et al. | |
| 2006/0236811 A1 | 10/2006 | Withers et al. | |
| 2007/0295167 A1 | 12/2007 | Ogasawara et al. | |
| 2008/0145687 A1 | 6/2008 | Pretorius | |
| 2009/0311154 A1 * | 12/2009 | Jha | C01F 7/142 423/86 |
| 2010/0061925 A1 | 3/2010 | Lee et al. | |
| 2011/0171116 A1 | 7/2011 | Klevtsov et al. | |
| 2012/0070578 A1 | 3/2012 | Han et al. | |
| 2013/0315773 A1 | 11/2013 | Moxson et al. | |

FOREIGN PATENT DOCUMENTS

| | | |
|---|---|---|
| GB | 800689 | 8/1958 |
| GB | 807889 | 1/1959 |
| JP | H01-192727 A | 8/1989 |
| JP | 2000219922 A | 8/2000 |
| JP | 2009518544 A | 5/2009 |
| KR | 10-1259434 B1 | 4/2013 |
| WO | WO 2007/097823 A2 | 8/2007 |
| WO | WO 2010/036131 | 4/2010 |
| WO | WO 2011/106804 A1 | 9/2011 |
| WO | WO 2013/100963 A1 | 7/2013 |
| WO | WO 2014187867 | 11/2014 |
| WO | WO 2015/050637 | 4/2015 |

OTHER PUBLICATIONS

Astrelin et al, "Interaction of TiHx (x>2) with solutions of some acids and alkalies." Hydrogen Materials Science and Chemistry of Metal Hydrides. 2002;82:133-40.
Bolivar et al, "Recycling, Synthesis of titanium via magnesiothermic reduction of TiO2 (Pigment)", Proceedings of EMC (2009) 1-17.
Chen et al, "Direct Electrochemical Reduction of Titanium Dioxide to Titanium in Molten Calcium Chloride." Nature. 2000;407:361-4.
Crowley, "A new process for titanium extraction and production promises to cut costs and expand applications", Advanced materials & processes (2003) 25-27.
Fang et al, "A new, energy-efficient chemical pathway for extracting Ti Metal from Ti minerals", JACS 135 (2013) 18248-18251.
Froes, "The production of low-cost titanium powders." JOM. 1998;50(September):41-3.
Froes, "Titanium powder metallurgy: a review—Part 1: titanium and its alloys are the materials of choice for many applications, but high cost often negates their use. Powder metallurgy offers a cost-effective fabrication approach", Advanced Materials & Processes 170.9, Sep. 2012, 6 pages, vol. 16, No. 7.
Gueguin, "Chemistry and mineralogy of titanium-rich slags. Part I—Hemo-ilmenite, sulphate, and upgtaded titania slags", Mineral Processing & Extractive Metall. Rev. 28 (2007) 1-58.
Hartman et al, "Producing lower-cost titanium for automotive applications", JOM 50 (1998) 16-19.
Hunter, "Metallic titanium", JACS 32 (1910) 330-336.
Kikuchi et al, "Rapid reduction of titanium dioxide nano-particles by reduction with a calcium reductant", J. Phys. Chem. Solids 75 (2014) 1041-1048.
Kroll, "The production of ductile titanium." Trans Met Soc AIME. 1959;215:546-53.
Lasheen, "Soda ash roasting of titania slag product from Rosetta ilmenite." Hydrometallurgy. 2008;93(3-4):124-8.
Lin, "The effect of alkali salt catalyst on the carbothermic reduction of nickel oxide." Metallurgical Transactions B. 1987;19B:685-6.
Middlemas et al, "A new method for production of titanium dioxide pigment", Hydrometallurgy 131 (2013) 107-113.
Middlemas, "Energy-conscious production of titania and titanium powders from slag", University of Utah, (2014).
Nersisyan et al, "Direct magnesiothermic reduction of titanium dioxide to titanium powder through combustion synthesis", Chem. Eng. J. 235 (2014) 67-74.
Oh et al, "Deoxidation of Ti powder and preparation of Ti ingot with low oxygen concentration", Mater. Trans. 53 (2012) 1075-1077.
Oh et al, "Preparation of low oxygen content alloy powder from Ti binary alloy scrap by hydrogenation-dehydrogenation and deoxidation process", J. Alloys Compd. 593 (2014) 61-66.
Okabe et al, "Titanium powder production by preform reduction process (PRP)", J. Alloys Compd. 364 (2004) 156-163.
Rao et al, "Catalysis by alkali carbonates of carbothermic reduction of magnetite concentrates." Ironmaking and Steelmaking. 1984;11(6):308-18.
Suzuki et al, "Calcium-deoxidation of niobium and titanium in Ca-saturated CaCl$_2$ molten salt", J. Alloys Compd. 288 (1999) 173-182.
Technologies E. Summary of Emerging Titanium Cost Reduction Technologies. Vancouver, WA2004. p. 12.

(56) References Cited

OTHER PUBLICATIONS

Vuuren et al, "Opportunities in the Electrowinning of Molten Titanium from Titanium Dioxide", JOM, Oct. 2005, 3 pages.
Won et al, "Titanium powder prepared by a rapid exothermic reaction", Chem. Eng. J. 157 (2010) 270-275.
Xu et al, "Behavior of calcium chloride in reduction process of titanium dioxide by calcium vapor", J. Alloys Compd. 576 (2013) 208-214.
Xue, "Production of Titanium Dioxide by Decomposition of Titanium Slag with Molten Sodium Hydroxide", Dalian University of Technology, (2009).
Zhang et al, "A literature review of titanium metallurgical processes", Hydrometallurgy 108 (2011) 177-188.
Zhang et al, "A novel preparation of titanium dioxide from titanium slag." Hydrometallurgy. 2009;96(1-2):52-6.
Zheng et al, "Production of titanium powder by the calciothermic reduction of titanium concentrates or ore using the preform reduction process", Mater. Trans. 48 (2007) 2244-2251.
Barksdale; *Titanium: Its Occurrence, Chemistry, and Technology*; (1949); pp. 41-52; $2^{nd}$ edition; Ronald Press Co., New York.
Dupont™; "Ti-Pure® R-706 Titanium Dioxide"; Chemours; (2015); 3 pages; [retrieved on May 7, 2018]; Retrieved from <URL: https://web.archive.org/web/20151025112946/hhttps://www.chemours.com/Titanium_Technologies/en_US/products/706/index.html>.
Baba et al.; "Tantalum and Niobium Powder Preparation from their Oxides by Calciothermic Reduction in the Molten $CaCl^2$;" Journal of Physics and Chemistry of Solids; (Feb.-Apr. 2005); pp. 466-470; vol. 66, Issues 2-4; <doi: 10.1016/j.jpcs.2004.06.042 >.
Rittmeyer et al.; "Hydrides;" Ulmann's Encyclopedia of Industrial Chemistry; (2012); pp. 103-132; vol. 18; <doi: 10.1002/14356007.a13_199 >.

\* cited by examiner

Relative amount of various reaction products of Ti-slag reacted with Mg (or MgH2) in H2 atmosphere at different temperatures, based on thermodynamic analysis using HSC

PRODUCING A TITANIUM PRODUCT

RELATED APPLICATION(S)

This application claims the benefit of U.S. Provisional Patent Application Ser. No. 61/867,467, filed Aug. 19, 2013, which is incorporated herein by reference.

GOVERNMENT INTEREST

This invention was made with government support under DE-AR0000420 awarded by the Department of Energy. The government has certain rights in the invention.

BACKGROUND

Titanium is strong, light weight, corrosion resistant, and biocompatible. This unique combination of properties makes it a valuable natural resource well suited for numerous potential commercial applications. Titanium has been manufactured commercially since at least 1948 and is broadly used in the aerospace, medical, and military defense industries. For example, the U.S. Geological Survey, Mineral Industry Surveys on titanium, reports that approximately 67% of mill products and castings during 2011 were used in commercial and military aerospace applications. Yet, other industries where titanium's properties would be useful still rely heavily upon general purpose steel. Heavy dependence on steel is not surprising because producing titanium by conventional methods can be twenty times more expensive than producing steel. Much of this high cost is due to the indirect nature of known processes, which are time-intensive and require high amounts of energy, as illustrated and discussed with reference to FIGS. 1-4 below.

FIG. 1 illustrates a conventional titanium production method 100. At stage 101, $FeTiO_3$, also referred to as ilmenite, a natural ore, is reduced to a titanium rich slag ($TiO_2$-slag) and pig iron (pig Fe) by a carbothermal process. At stage 102, chemical extractive metallurgy processes are utilized to remove some unwanted impurities and produce an upgraded $TiO_2$ (also referred to as synthetic rutile). At stage 103, synthetic rutile is chlorinated with chlorine under high temperature (typically in the range of 800 to 1000° C.) to form titanium tetrachloride ($TiCl_4$). Two well-known commercial processes have been used to process $TiCl_4$: Kroll and Hunter.

Hunter process 104, as originally practiced and developed by metallurgist and professor Matthew Hunter at the Rensselaer Polytechnic Institute, involves reducing $TiCl_4$ with elemental sodium in a sealed steel pot under high temperature (approximately 900° C.) and pressure, to form titanium sponge and molten sodium chloride. Subsequently, the Hunter process was updated to a two stage process. In stage one of an updated Hunter process 104, $TiCl_4$ is reduced with sodium to $TiCl_2$, discharged from the first reactor, and fed with molten salt to a second stage batch reactor (over a furnace and under inert gas atmosphere) where it is combined with molten sodium to complete reduction to titanium sponge. After the reaction completes and the sealed pot cools, salt is washed away with hydrochloric acid solution and then dried. While the Hunter process 104 can theoretically make highly pure titanium metal, it is inefficient, time consuming, and costly, and therefore impractical for many industries.

The Kroll process 105, was developed by Wilhelm Kroll as an alternative to the Hunter process 104, and is described in U.S. Pat. No. 2,205,854 (issued Jun. 25, 1940). According to the Kroll process 105, $TiCl_4$ is reduced with magnesium metal at atmospheric pressure and temperatures above 800° C. An inert gas is employed with the magnesium reducing agent in the reactor. Chips of metal bored from the reactor are treated with water and hydrochloric acid to remove magnesium chloride ($MgCl_2$). It has been reported that the Kroll process took nearly 10 years to scale-up into a commercial production process.

In more recent history, particularly the past 20 years, research has continued in attempts to identify more economical methods of producing titanium. FIG. 2 illustrates one such method known as the Armstrong process 200. This process 200 begins at stage 201, where ilmenite ore undergoes carbothermal reduction to Ti-slag and pig Fe, followed by chemical extraction at stage 202, and high temperature chlorination of upgraded synthetic rutile to $TiCl_4$ at stage 203. Stage 204 is a continuous process for reduction of $TiCl_4$ using molten sodium (Na) metal. Although the Armstrong process presents some advantages over the Hunter and Kroll processes, a number of challenges remain. In one aspect, the Armstrong process results in a Ti powder having the consistency of mini sponges, making subsequent processes, such as compacting and sintering, difficult. In another aspect, molten sodium is a costly material and regenerating Na (from NaCl) is an energy intensive process. Furthermore, the Armstrong process still requires $TiCl_4$. Therefore, the benefits of the Armstrong process are limited.

Subsequent to Kroll and Hunter, methods have been developed that modify the number of steps required to process titanium. One example, illustrated in FIG. 3, is the FCC Cambridge process. Method 300 begins at stage 301 where ilmenite ore undergoes carbothermal reduction to Ti-slag and pig Fe followed by chemical extraction at process 302. At stage 303, the FCC Cambridge process uses electrolysis to electrochemically reduce upgraded synthetic rutile to Ti sponge or powder.

In January of 2004, the U.S. Department of Energy and Oak Ridge National Laboratory (ORNL) released a report titled "Summary of Emerging Titanium Cost Reduction Technologies," in which it identified and described sixteen emerging titanium reduction processes. Despite considerable effort and financial support, such efforts have not been widely adopted, nor proven to be commercially used in many instances for a variety of reasons.

As described above, the existing technologies, including both commercial and developmental processes, can be broadly segmented into two groups: (1) processes employing reduction of $TiCl_4$, and (2) processes employing reduction of $TiO_2$ to indirectly produce titanium. The emphasis of research of reduction of $TiCl_4$ has largely focused on optimizing the $TiCl_4$ reduction process. The emphasis of research by reduction of $TiO_2$, in contrast, has largely focused on avoidance of high-temperature chlorination. Nonetheless, both segments and related research still require chemical extractive processes to obtain the upgraded (highly refined) rutile feed to subsequent process steps—also a costly step.

None of the aforementioned methods provide a method of titanium production that adequately improves the economic viability of titanium metal. FIG. 4 illustrates typical costs associated with conventional production of titanium. Magnesium and sodium reduction processing (e.g., Hunter process 103 and Kroll process 104 of FIG. 1) represent approximately 66% of total production costs. Chlorination to form $TiCl_4$ represents about 24% of the total production costs, with the remaining 10% attributable to production of upgraded rutile. Thus, there remains a need for a simplified and reduced cost method for the production of titanium metal.

SUMMARY

The present disclosure is directed to a method for producing a titanium product, such as titanium powder or sponge, directly from $TiO_2$-slag. The method can comprise obtaining $TiO_2$-slag, and producing the titanium product from the $TiO_2$-slag using a metallic reducing agent at a moderate temperature and a pressure to directly produce the titanium product which is chemically separated from metal impurities in the $TiO_2$-slag. The titanium product can comprise $TiH_2$ and optionally elemental titanium. Metal impurities can be removed from the titanium product to form a purified titanium product using leaching, purifying and/or separation steps.

In one aspect, the method can comprise alkaline roasting the $TiO_2$-slag to remove impurities from the slag and produce intermediate products such as derivatives of sodium titanate and metatitanic acid. In another aspect, the method can comprise reducing the alkaline leached and water-washed products, or metatitanic acid using a metallic reducing agent at a temperature and a pressure to produce a titanium product comprising titanium hydride and/or elemental titanium.

In one aspect, the method can comprise alkaline roasting the $TiO_2$-slag to remove impurities from the slag and leaching to produce substantially pure titanium dioxide ($TiO_2$). In another aspect, the method can comprise reducing the titanium dioxide using a metallic reducing agent at a temperature and a pressure to produce a titanium product comprising $TiH_2$ and/or elemental titanium.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
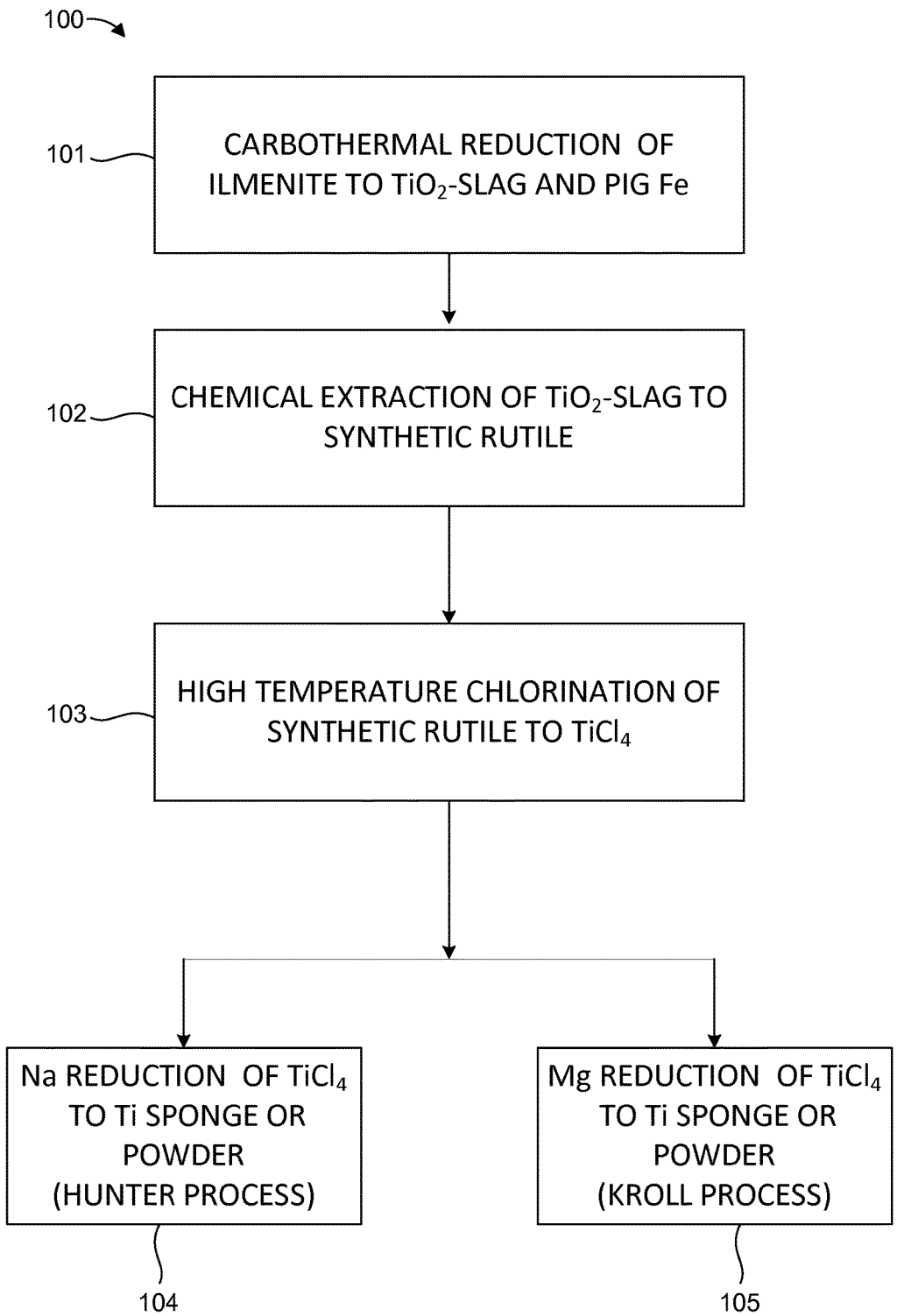
FIG. 1 is a process flow diagram illustrating conventional titanium production processes including Hunter and Kroll reductions.
Figure 2:
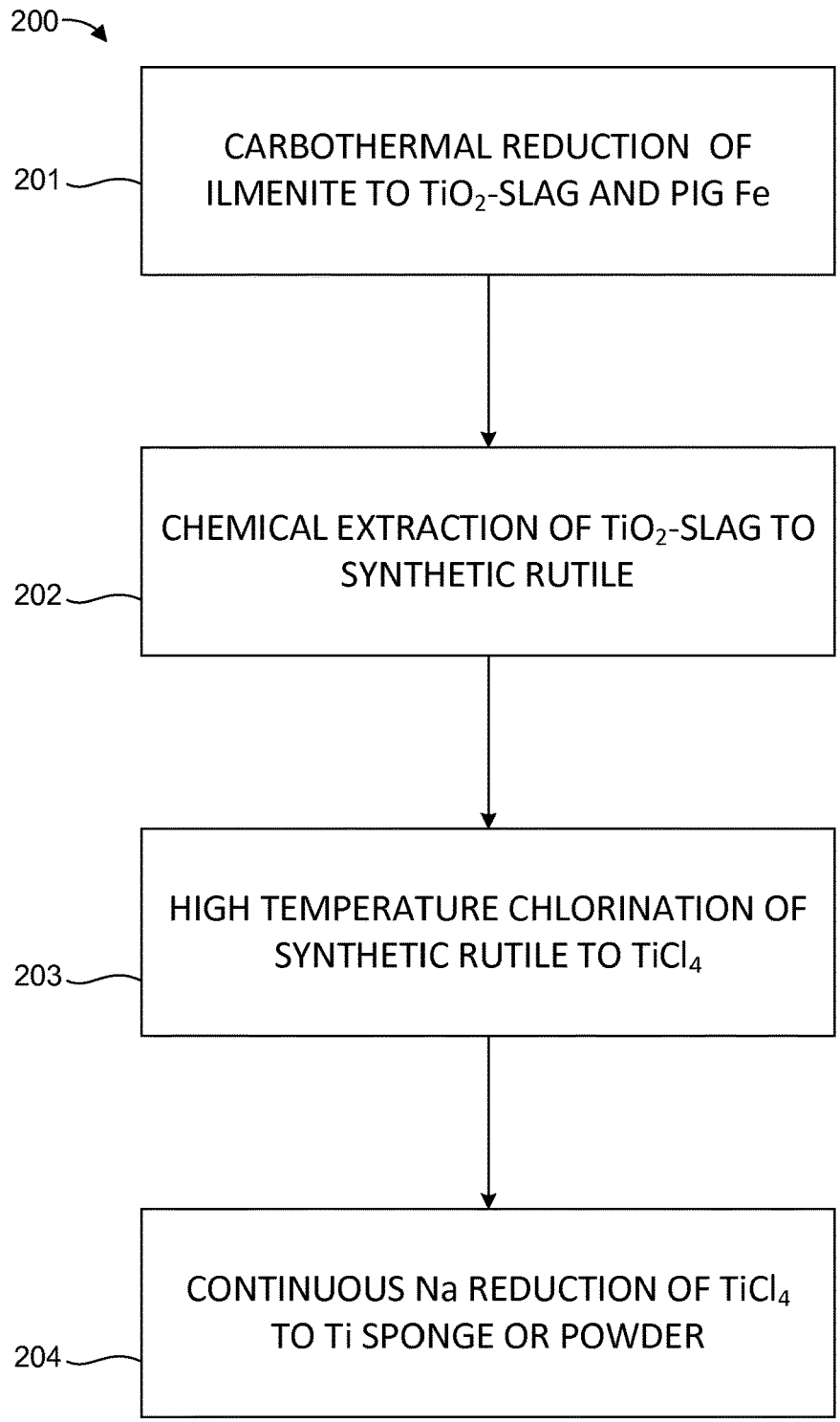
FIG. 2 is a process flow diagram illustrating the Armstrong process for production of titanium sponge or powder.
Figure 3:
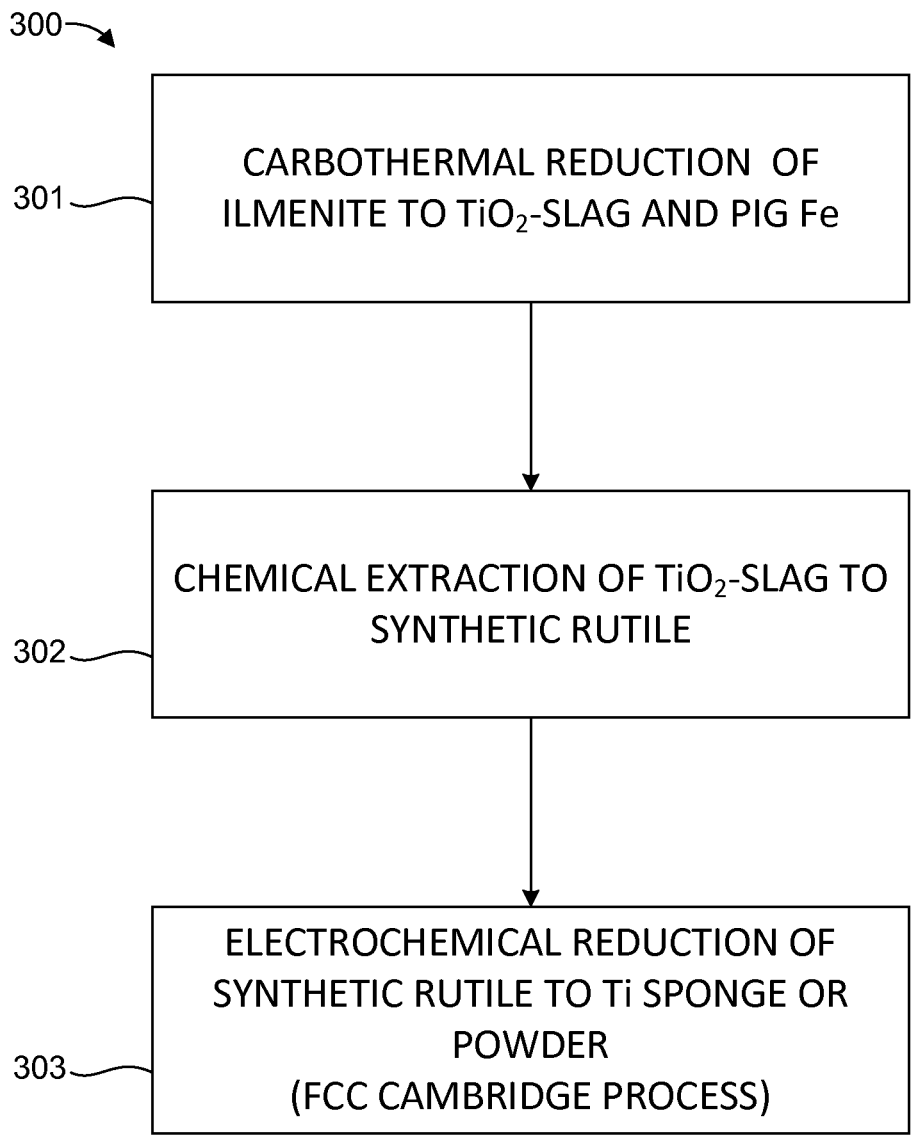
FIG. 3 is a process flow diagram illustrating the FCC Cambridge process for production of titanium sponge or powder.
Figure 4:
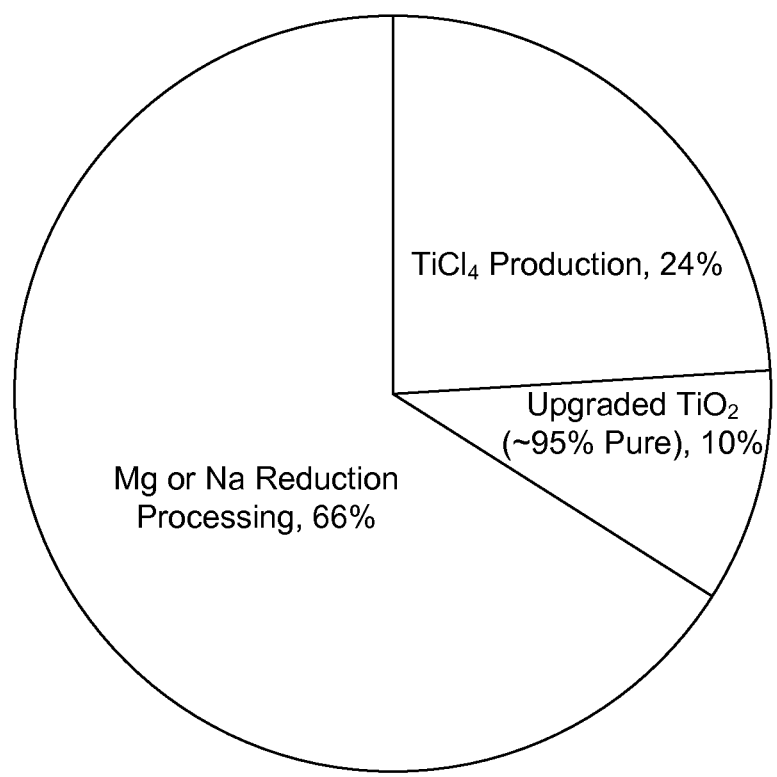
FIG. 4 is a pie chart which illustrates typical costs associated with conventional production of titanium.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

DEFINITIONS

In describing and claiming the present invention, the following terminology will be used.

The singular forms "a," "an," and "the" include plural referents unless the context clearly dictates otherwise. Thus, for example, reference to "a reducing agent" includes reference to one or more of such materials and reference to "subjecting" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, or combinations of each.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Figure 5:
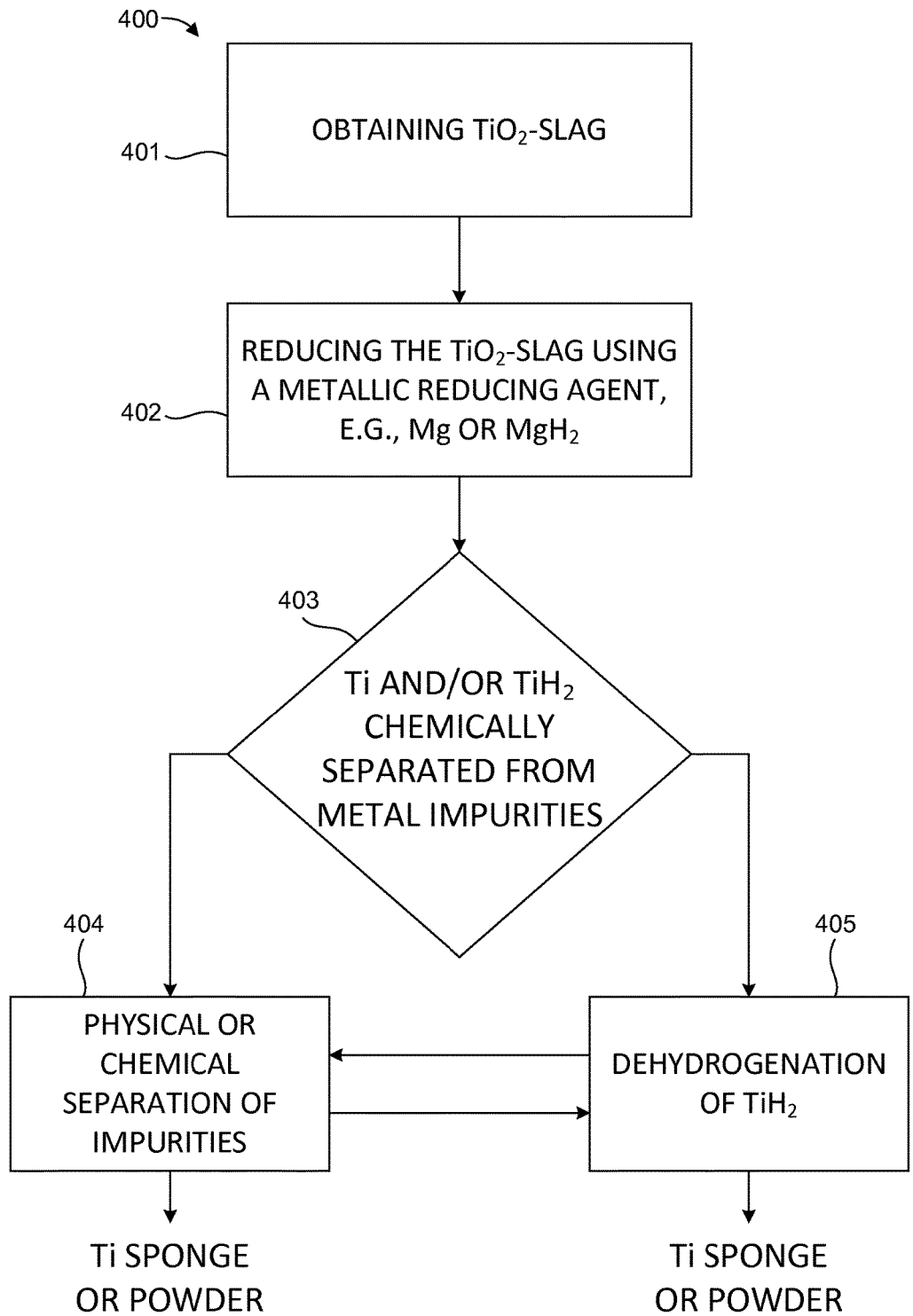
FIG. 5 illustrates a method for producing a titanium product in accordance with an example of the present disclosure.

FIG. 5 illustrates an embodiment of a method 400 for producing a titanium product, which can be done directly from $TiO_2$-slag. The titanium product can include, for example, $TiH_2$ and/or elemental titanium in powder and/or sponge form. The method 400 can include obtaining $TiO_2$-slag 401. A variety of raw materials may be employed in the present method, including natural materials extracted from the earth and/or pre-processed materials, such as natural rutile ($TiO_2$), ilmenite ($FeTiO_3$), and leucoxene (an alteration product of titanium containing minerals). Such materials may be composed of varying degrees of titania. In one aspect, the $TiO_2$-slag can be obtained by carbothermally reducing a titanium feedstock comprising ilmenite, and/or leucoxene, which can be done in a reactor. Specific conditions can vary, however as a general guideline, such carbothermal reduction can include heating to a temperature from about 1000 to 1600° C. The result is $TiO_2$-slag, which in addition to $TiO_2$ includes other reaction products or impurities, such as pig Fe. Typically, $TiO_2$-slag can include from 70 to 85 wt % $TiO_2$.

The slag used in this investigation was provided by Rio Tinto QIT and goes by the trade name of Sorelslag®. The slag is a solid-solution of various titanate compounds with a pseudobrookite structure (Borowiec et al., 1998). The relative proportion of compounds within the primary phase is $(FeTi_2O_5)_{0.31}(MgTi_2O_5)_{0.30}(Ti_3O_5)_{0.31}(Al_2TiO_5)_{0.06}(MnTi_2O_5)_{0.008}$. A more detailed description of the mineral characteristics of Sorelslag® is provided by Borowiec et al.

In another aspect, the term Ti-slag as used in the application also include what is known as "upgraded slag" or UGS. UGS is typically produced by purifying regular Ti-slag by a series of leaching processes. UGS is typically composed of greater than 90% $TiO_2$. UGS is similar in $TiO_2$ content to another industrial product that is called "synthetic rutile". For convenience of this application, the term $TiO_2$-slag implies all those concentrated Ti minerals that could be used as the raw material for the processes described in this specification.

The method can also include reducing the $TiO_2$-slag using a metallic reducing agent 402 to directly produce the titanium product chemically separated from metal impurities in the $TiO_2$-slag 403. Chemically separated indicates that the titanium is not alloyed or chemically bond with other metal impurities. Direct reduction can be implemented by placing the $TiO_2$-slag in a temperature controlled vessel at low pressure and mixing it with a metallic reducing agent in a hydrogen atmosphere. Temperature control can generally be within a range of about 500 to about 1200° C. In one aspect, the metallic reducing agent includes Mg, $MgH_2$, and/or $CaH_2$. Although described in more detail herein, the metallic reducing agent can be introduced in at least stoichiometric amounts, and in some cases up to about 6 times the mole amount of Ti.

In one aspect, the $TiO_2$-slag can be ground to small particles and mixed with $MgH_2$ or other reducing agent. The initial particle size of $TiO_2$-slag can affect the kinetics of the reaction and/or the particle size of the reaction product. The slag particle size can be sized to avoid dissolution of $TiH_2$ during subsequent leaching processes (discussed below), but also to avoid oxidation in the final product. Particle size of $TiO_2$-slag can typically be from 0.1 micrometer to 5000 micrometers, and in many cases between 10 to 100 micrometers. Typically, the particle size of titanium hydride will depend on the original slag particle size, reaction temperature, and time. In another aspect, milling the $TiO_2$-slag can also enhance the degree of conversion. Suitable particle sizes can vary, however sizes from 10 to about 50 μm can provide good results.

The slag can be a solid-solution of various oxide compounds, and the total $TiO_2$ content of typical $TiO_2$-slag is 78.5%, with FeO, MgO, $SiO_2$, and $Al_2O_3$ contents of 9.8, 5.6, 2.8, and 2.4%, respectively. In one aspect, the slag can comprise "upgraded" $TiO_2$-slag with $TiO_2$ content higher than that of typical $TiO_2$-slag and impurity contents lower than those of typical $TiO_2$-slag. For example, upgraded typical $TiO_2$-slag can have higher $TiO_2$ content (94.5%) and thus much less impurities, which can result in less energy consumption in subsequent steps of the process discussed below.

Equations (1) through (8) are provided below to illustrate potential primary reactions for the direct reduction of $TiO_2$-slag with a metal or metal hydride reducing agent. In equations (1) through (8), $TiO_2$-slag (containing $TiO_2$) is combined with a Mg or $MgH_2$ reducing agent in the presence of hydrogen gas. In one embodiment, process 502 proceeds at relatively low temperature, for example, between 400 and 900° C., or between 700 and 1200° C., and produces reaction product 403. Reaction product 403 includes titanium hydride (see equations (1) through (4)). At a relatively higher temperature, for example, between 700 and 1200° C., reaction product 403 includes elemental titanium (see equations (5) and (8)).

$$TiO_2 + 2Mg + H_2 \rightarrow TiH_2 + 2MgO \tag{1}$$

$$FeTiO_3 + 3Mg + H_2 \rightarrow TiH_2 + 3MgO + Fe \tag{2}$$

$$TiO_2 + 2MgH_2 \rightarrow TiH_2 + 2MgO + H_2 \tag{3}$$

$$FeTiO_3 + 3MgH_2 \rightarrow TiH_2 + 3MgO + Fe + 2H_2 \tag{4}$$

$$TiO_2 + 2Mg \rightarrow Ti + 2MgO \tag{5}$$

$$FeTiO_3 + 3Mg \rightarrow Ti + 3MgO + Fe \tag{6}$$

$$TiO_2 + 2MgH_2 \rightarrow Ti + 2MgO + 2H_2 \quad (7)$$

$$FeTiO_3 + 3MgH_2 \rightarrow Ti + 3MgO + Fe + 3H_2 \quad (8)$$

Figure 6:
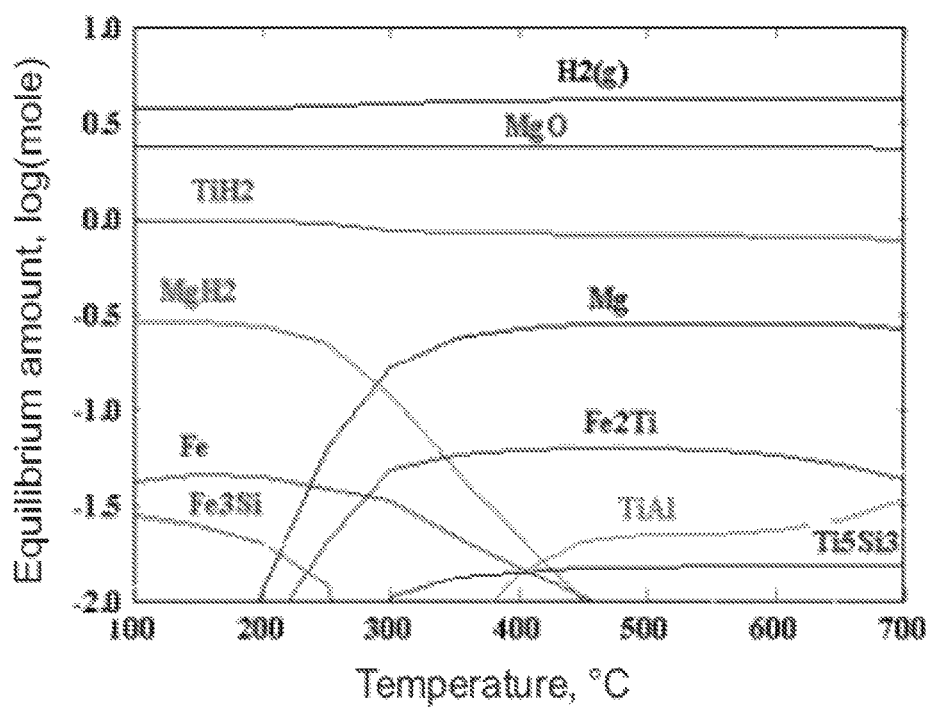
FIG. 6 illustrates relative amounts of various reaction products from a direct reduction of $TiO_2$-slag by a magnesium or magnesium hydride reducing agent in accordance with an example of the present disclosure.

Although not shown in equations (1) through (8) above, one of ordinary skill in the art understands that $TiO_2$-slag typically contains elements in addition to $TiO_2$. These additional materials may include, for example, iron (Fe), magnesium (Mg), calcium (Ca), aluminum (Al), silicon (Si), and vanadium (V). The $TiO_2$-slag is typically about 80% $TiO_2$, and 20% other material. Therefore, reaction product 403 will typically include a physical mixture of $TiH_2$ or Ti metal and various impurities. FIG. 6 illustrates potential relative amounts of various reaction products resulting from the direct reduction of Ti-slag by a Mg or $MgH_2$ reducing agent. Referring back to FIG. 5, such impurities can be removed via a series of separation process 404. Because of its unique chemical and physical properties, including insolubility in water and resistance to solutions of moderate acidity, Ti can be separated from impurities by one or more known physical and chemical extractive metallurgy techniques, for example, magnetic separation, gravimetric separation, centrifugal separation, ammonia chloride leaching, alkaline leaching, and dilute acid leaching. Likewise, process 404 can include such known methods for separating Ti from impurities. The aforementioned physical and/or chemical separation methods are generally well established in the extractive metallurgy industry and the research community. Thus, by directly reducing $TiO_2$-slag as disclosed herein, Ti can be chemically separated from other impurity elements in the slag without using the conventional high temperature processes, and can be further separated from the impurities by a series of chemical leaching and/or separations steps.

For example, when $MgH_2$ is used to react with $TiO_2$-slag under hydrogen, $TiH_2$ is formed. By forming $TiH_2$, Ti is chemically separated from the rest of the compounds in slag. Forming $TiH_2$, rather than Ti metal, is advantageous because Ti metal is more prone to forming alloys with other elements such as Fe, which can be difficult to separate. In addition, $TiH_2$ has very unique chemical properties. It is insoluble in water, resistant to moderate acid solutions, and has minimum or no solubility for other impurities in the slag. Furthermore, $TiH_2$ is impervious to oxygen pickup compared to Ti metal, which helps to keep oxygen levels low in the final metal product. It should be noted that the insolubility of $TiH_2$ in water is attributed to its kinetic passivation by water. These properties set up a condition by which the product of the direct reduction of $TiO_2$-slag can be sequentially leached to remove other impurity elements to separate and purify the $TiH_2$. Although the chemical resistance of $TiH_2$ enables it to be separable from other impurities, if the particle size of $TiH_2$ is too small, e.g. in the sub-micrometer scale, it can become soluble in those solutions.

Compared to the conventional processes, which first purify $TiO_2$ and then reduce it, a method in accordance with the present disclosure first reduces $TiO_2$ to chemically isolate Ti from its chemical bond to other elements such as Fe by forming $TiH_2$, and then purifies or separates the material by leaching other elements and compounds. This process eliminates the need for carbothermal chlorination of $TiO_2$ and the reduction of $TiCl_4$ by the Kroll or Hunter methods. However, the present invention also include procedures that purify the feed material at least partially before subjecting the material to the reduction by the reducing agent, followed by further leaching to remove unwanted reduction byproducts and impurities.

In one aspect, molten salts can be used to facilitate the reduction process because the kinetic rates of the reactions can be improved by the use of the liquefied salt. Specifically, molten salts have very high conductivity and facilitate electron transfer during the reduction reaction. Molten salt also has the effect of helping dissolving by-products such as MgO or CaO during the reduction process. The use of molten salts can also help to increase the particle size of $TiH_2$. In addition to mono-metal chloride, binary salts such as $MgCl_2$+NaCl, $MgCl_2$+KCl, and $MgCl_2$+$CaCl_2$ can be used along with other binary and ternary salt mixtures.

If $TiH_2$ is in reaction product 403, it can be readily converted to elemental Ti by dehydrogenation at optional process 405 depending on the desired final product. Heating $TiH_2$ to a temperature above about 400° C. or in vacuum or at pressures lower than the equilibrium pressure of $H_2$ at the corresponding temperature should release the hydrogen. In another embodiment, the heated hydrogen atmosphere may be replaced with argon to facilitate dehydrogenation. When the reaction product 403 is $TiH_2$, it can be separated from other elements in the mixture by using physical and chemical separation processes. It can also be dehydrogenated first before being subjected to the physical and/or chemical separation processes.

Figure 7:
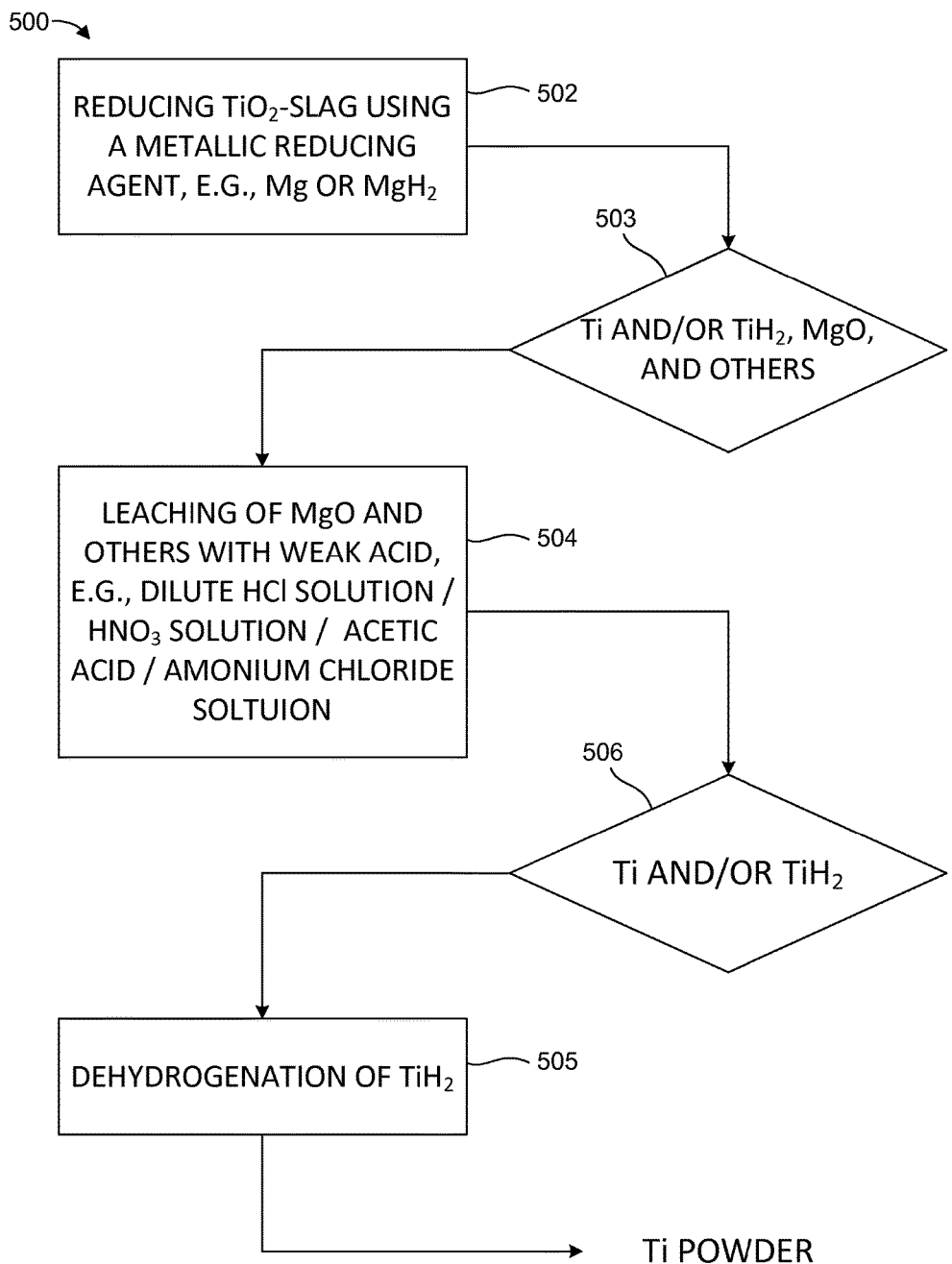
FIG. 7 is a flow diagram which illustrates a method for producing a titanium product in accordance with another example of the present disclosure.

FIG. 7 illustrates a method 500 of producing a titanium product in accordance with another example of the present disclosure. The method 500 is a variation of the method 400 of FIG. 5. As with the method 400, the method 500 includes reducing $TiO_2$-slag using a metallic reducing agent 502 to directly produce the titanium product chemically separated from metal impurities in the $TiO_2$-slag 503, a physical and/or chemical separation of impurities (i.e. leaching) 504 to produce Ti and/or $TiH_2$ 506, and dehydrogenation of $TiH_2$ 505. In this case, leaching is specifically used to remove unwanted impurities from reduced titanium slag.

$TiH_2$ can be separated from impurities by leaching the impurities using common chemical reagents. The leaching of impurities, such as magnesium, iron, aluminum, and silicon oxides, can be performed using acidic and/or alkaline solutions. MgO, a product of the reduction step, can be leached and recovered. In typical magnesium and calcium leaching processes to selectively dissolve the metals, organic acids are often used.

Ammonium chloride has been used as an elective leaching compound for magnesium oxide. The reaction is expected as follows:

$$MgO + 2NH_4Cl \rightarrow MgCl_2 + H_2O + 2NH_3(g)$$

This indicates ammonium chloride can be used as a leaching agent for MgO. Ammonia can be recovered successfully during leaching by sparging air in solution and trapping the ammonia in deionized water.

In the case of alumina and silica leaching, alkaline solutions are generally used. In this case also, intermediate products may form. The intermediate products can be reduced by $MgH_2$ to obtain $TiH_2$.

Leaching involving selective dissolution of titanium, iron, and other elements in a variety of mineral (hydrochloric acid and sulfuric acid) and organic acids (citric acid and oxalic acid) can be utilized.

In sulfuric acid, ilmenite can dissolve as follows:

$$FeTiO_3 + 4H^+ \rightarrow TiO^{2+} + Fe^{2+} + 2H_2O$$

A similar reaction can occur in hydrochloric acid. The use of carboxylic acids such as citric and oxalic acids facilitates similar reactions, although these compounds complex with metal ions and reduce their activity, which tends to enhance leaching. One factor to leaching success is the removal of impurity without the dissolution of the valuable material, which is TiH$_2$ in reduced slag.

Alternatively, other complexing agents can be used to reduce leaching times or to eliminate one leaching step.

In one embodiment, a three-step leaching process can be employed that uses sodium citrate in an ammonium chloride medium followed by low concentration of sodium hydroxide, followed by leaching in hydrochloric acid. In one aspect, the sodium citrate can be replaced by a complexing agent such as sodium phosphate, ethylene diaminetetraacetic acid, sodium oxalate, nitrilotriacetate, sodium gluconate, anhydroerythritoldiethylenetriaminepentaacetic acid, 4,5-dihydroxy-1,3 benzenedisulphonic acid disodium salt or other compound or combination of compounds that complex with iron, aluminum, silicon, and/or magnesium. In another aspect, the leaching process using sodium citrate in an ammonia chloride medium can be replaced by a leaching process in dilute HCl solution.

In another embodiment, a two-step leaching process can be employed that uses a low concentration of sodium hydrogen phosphate in an ammonium chloride medium followed by leaching in low concentration hydrochloric acid.

In another embodiment, MgO can be leached using dilute HCl solutions sequentially by replenishing HCl as it is consumed.

The majority of the oxides, including FeO, Al$_2$O$_3$, and SiO$_2$, can all be reduced along with TiO$_2$ during the direct reduction process using MgH$_2$. Intermetallic compounds such as Fe$_2$Ti, TiAl, and Ti$_5$Si$_3$ may form based on the thermodynamic analysis. Any remaining metal or metal oxide compounds such as Fe can be dissolved using a relatively dilute mineral acid, such as HCl. Residual MgO in the mixture can also be dissolved by the dilute HCl solution. Hydrochloric acid can be recovered from chlorine produced during the magnesium production process. The chlorine can be combined with hydrogen gas in a burner to produce HCl. The resulting hydrochloric acid can be reused in the leaching process as needed and the remainder sold.

Figure 8:
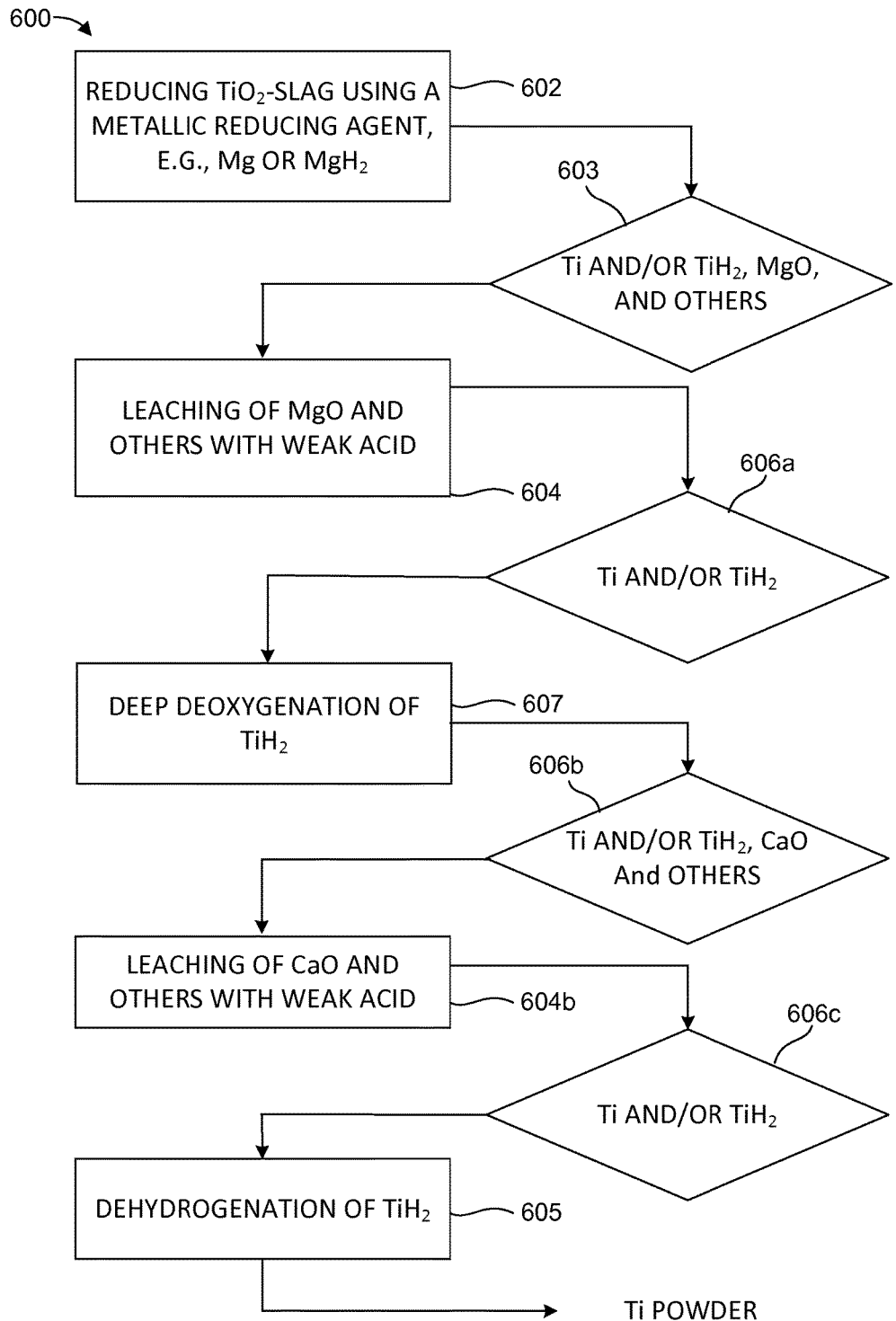
FIG. 8 is a flow diagram which illustrates a method for producing a titanium product in accordance with yet another example of the present disclosure.

FIG. 8 illustrates a method 600 of producing a titanium product in accordance with yet another example of the present disclosure. In one aspect, the method 600 can produce a titanium product with low residual oxygen content. The method 600 is another variation of the method 400 of FIG. 5. As with the method 400, the method 600 includes reducing TiO$_2$-slag using a metallic reducing agent 602 to directly produce the titanium product chemically separated from metal impurities in the TiO$_2$-slag 603, a physical and/or chemical separation of impurities (i.e, leaching) 604 to produce Ti and/or TiH$_2$ 606a, and dehydrogenation of TiH$_2$ 605. The leaching step 604a can typically be accomplished using a weak acid for removal of MgO and other impurities. Non-limiting examples of suitable weak acids can include dilute HCl—HNO$_3$ solution, acetic acid, ammonium chloride, and the like. In this case, however, the Ti and/or TiH$_2$ product 606a is also deeply deoxidized 607 by CaH$_2$ to minimize the residual oxygen content in the Ti and/or TiH$_2$ product 606b. An additional leaching step 604b can be used to remove CaO and any other impurities using a weak acid such as those used in leaching step 604a to form a purified titanium product 606c.

Following the removal of impurities in the reduced product by leaching processes, the titanium or titanium hydride powder can contain relatively high oxygen content. The titanium or titanium hydride powder can then be deep-deoxidized by using CaH$_2$ at a relatively high temperature to get titanium or titanium hydride powder with low oxygen content. Residual oxygen may be present in the product of reduction by MgH$_2$. Oxygen (O) has a high solubility in titanium. In α-Ti, the solubility is up to 33.3 at. % (14.3 wt. %). It has an adverse effect on the mechanical properties of Ti alloys. Even 0.35 wt. % oxygen can be significantly detrimental to the mechanical properties of Ti product, especially ductility. For commercially pure (CP) titanium (grade 1), an oxygen level less than 0.2 wt. % is required. Therefore, oxygen level in the powder can be minimized. From a thermodynamic point of view, there is a limit for minimizing the oxygen in Ti using Mg at elevated temperatures, which is about ~1.5% at 600° C. In addition, the greatest driving force of titanium de-oxidation is the diffusion of oxygen atoms within titanium (when oxygen level is less than 33.3 at. %/14.3 wt. %). When de-oxidation of titanium is carried out above ~900° C., titanium transforms from a hexagonal close-packed (hcp) to body-centered cubic (bcc) crystal structure. In the latter structure, the diffusion of oxygen becomes relatively more active. Before reaching the transformation temperature of titanium, the diffusion speed of oxygen is low; however, after transformation to bcc structure at the high temperature above transformation, atomic movement occurs more than 100 times faster than before. Therefore a further high-temperature reduction step may be performed.

Ca is one option for further minimizing oxygen from ~2% to less than 0.2% at high temperature. In one aspect, CaH$_2$ may be used as the reductant. CaH$_2$ is able to minimize the oxygen content in Ti less than 0.2%, which has been demonstrated in the so-called metal hydride reduction (MHR) process. Reportedly CP titanium has been produced in Russia from titanium dioxide by reduction with calcium hydride as follows:

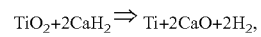
TiO$_2$+2CaH$_2$ ⇒ Ti+2CaO+2H$_2$,

The reaction is performed at temperature range from 1100 to 1200° C.

CaO is an alternative to CaH$_2$, as CaO can reacts with Mg to form CaH$_2$ in hydrogen atmosphere, as patented by Peter Alexander in 1954.

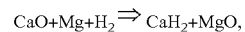
CaO+Mg+H$_2$ ⇒ CaH$_2$+MgO, which occurs at ~530° C., confirmed by a DSC analysis.

In the CaH$_2$ reduction process, the titanium hydride (or titanium) powder, obtained from magnesium or magnesium hydride reduction process, can be mixed with CaH$_2$ or CaH$_2$/CaCl$_2$ and heated up to a temperature higher than that for a magnesium or magnesium hydride reduction process and held there for sufficient period of time to allow the removal of residual oxygen content in the titanium or titanium hydride powder. The unreacted CaH$_2$, CaCl$_2$ and produced CaO in the product of the CaH$_2$ reduction process can then be washed away to get titanium or titanium hydride powder with minimized residual oxygen.

The combination of the reductions by MgH$_2$ and CaH$_2$ is a two-step reduction process. This two-step reduction process is advantageous to a one-step reduction by either MgH$_2$ or CaH$_2$ in two ways: 1). The temperature of the first step reduction by MgH$_2$ is sufficiently low (e.g. from 400 to 900° C.) to minimize chance of alloying Ti with impurity elements; 2). By using CaH$_2$ to further deoxygenize the materials as the second step of reduction ensures minimization of oxygen content without having to use excessive amounts of calcium, compared to a one-sep reduction using CaH$_2$.

In another aspect of this invention, a high temperature process is designed to increase the particle size of TiH$_2$ to minimize oxygen content in the final product. Oxygen content of Ti or TiH$_2$ powders are highly dependent on their specific surface areas, i.e. the particle sizes. In order to increase the kinetic rates of the reductions, it is desirable to have smaller particle sizes. In order to minimize oxygen, it is also desirable to have larger particle sizes. Therefore, the process is designed such that the MgH$_2$ reduction is carried out at a relatively low temperature with a relatively fine particle sizes (<50 micrometers). Then, during the high temperature deoxygenation by CaH$_2$, the thermal cycle is designed to promote particle coarsening, thus obtaining TiH$_2$ product with particle sizes greater than 30 micrometers with low oxygen content. The high temperature coarsening is integrated with the thermal cycle for deoxygenation using CaH$_2$. Typically, high temperature deoxygenation can be carried out at temperatures from about 700 to about 1200° C., although any temperatures which promote deoxygenation and coarsening can be used.

Figure 9:
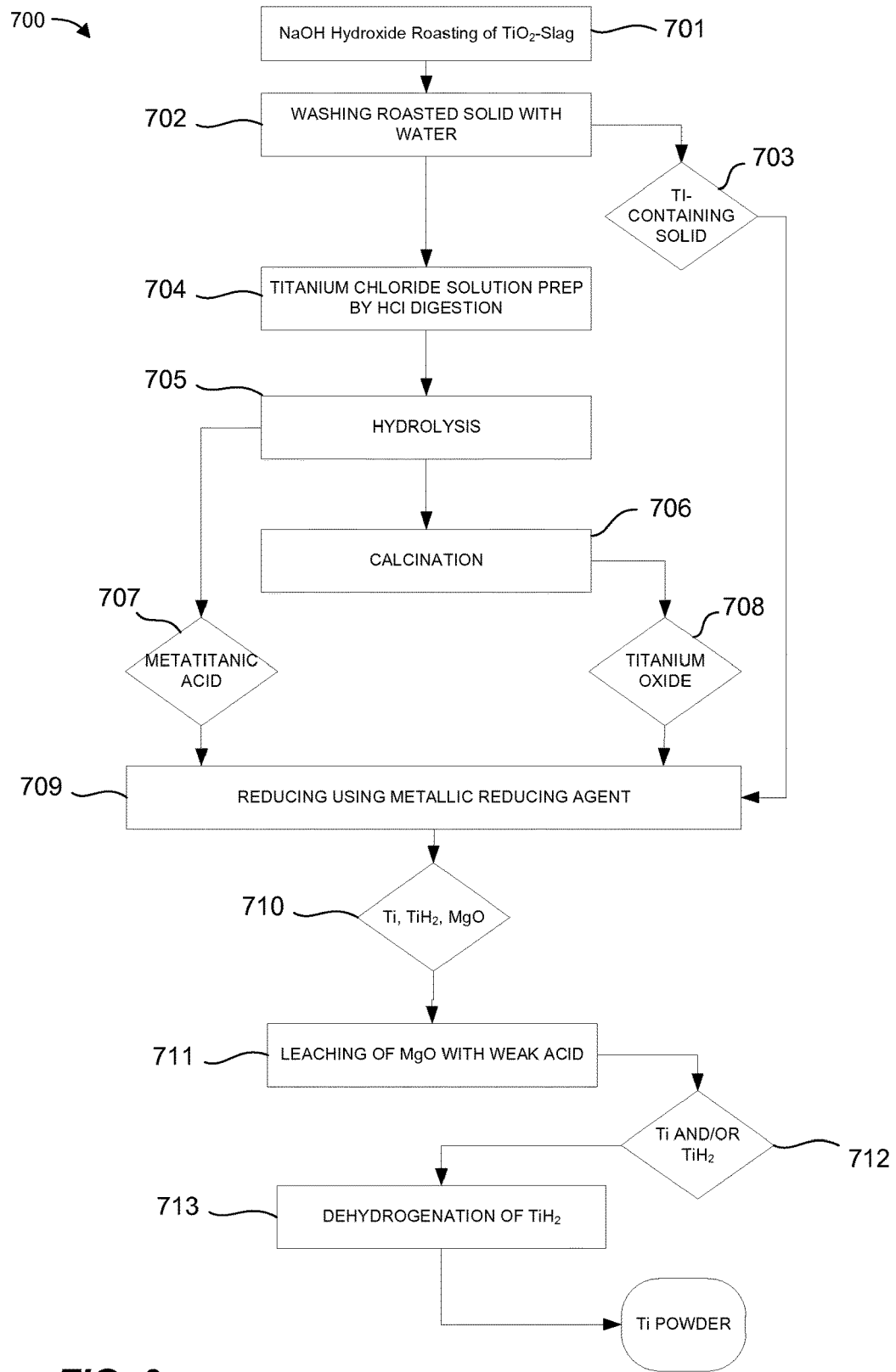
FIG. 9 is a flow diagram which illustrates a method for producing a titanium product in accordance with still another example of the present disclosure.

FIG. 9 illustrates a method 700 of producing a titanium product in accordance with still another example of the present disclosure. The method 700 is a variation of the method 400 of FIG. 5. As with the method 400, the method 700 includes reducing TiO$_2$ material using a metallic reducing agent 709 to directly produce the titanium product chemically separated from metal impurities in the TiO$_2$-slag 710, a physical and/or chemical separation of impurities (i.e. leaching) 711 to produce Ti and/or TiH$_2$ 712, and dehydrogenation of TiH$_2$ 713 to produce a titanium powder product. In this case, however, instead of reducing TiO$_2$-slag, purer TiO$_2$ obtained from alkaline roasting TiO$_2$-slag or upgraded TiO$_2$-slag is reduced. Thus, in one aspect, TiO$_2$-slag or upgraded TiO$_2$-slag can be purified by an alkaline roasting process 701 before subjected to direct reduction process 709.

In yet another alternative to the method 700, instead of using pure TiO$_2$, intermediate products from alkaline roasting TiO2-slag or upgraded TiO2-slag and subsequent leaching steps are reduced. The intermediate products include alkaline leached and water-washed product, which is a derivative of sodium titanate, and metatitanic acid (H$_2$TiO$_3$).

The alkaline roasting process can include NaOH roasting of TiO$_2$-slag or upgraded TiO$_2$-slag 701. For example, a mixture of TiO$_2$-slag (or upgraded TiO$_2$-slag) and NaOH can be heated up to around 450-650° C. and held at that temperature for a period of time to allow the complete transformation of TiO$_2$ in the slag into sodium titanate and the transformation of the major impurities such as Si and Al in the slag into soluble salts. The alkaline roasting process 701 can also include washing roasted solid with water 702 to get a titanium containing solid 703. For example, the roasted product can be washed with water to remove unreacted NaOH and impurity-bearing soluble salts and to get solid metatitanic acid. In addition, the alkaline roasting process can include titanium chloride solution preparation by HCl digestion 704 followed by hydrolysis 705. For example, the NaOH roasted and water washed product can be digested by HCl solution to get titanium chloride solution, which can then be subjected to hydrolysis at the temperature of the boiling point to get even purer metatitanic acid 707. This highly purified metatitanic acid can then be subjected to direct reduction process 709 to produce titanium hydride or titanium powder. Thus, in one aspect, the alkaline roasting process includes digestion and hydrolysis steps to get even further purified TiO$_2$ feedstock before subjected to direct reduction process.

In addition, hydrolysis step 705 can be followed by a calcination step 706. During this step the product of hydrolysis, i.e. metatitanic acid, transforms to pure TiO$_2$. The resulting upgraded TiO$_2$-slag can then be directly reduced in reduction process 709. Following reduction a titanium product including titanium hydride and often pure titanium, also includes MgO and other impurities 710. These impurities can be removed through a leaching step 711 as described previously. The resulting purified titanium product 712 can be further treated by dehydrogenation step 713 to produce a titanium powder in a manner similar to those described above.

EXAMPLES

The feasibility of a method according to the present disclosure is confirmed and exemplified by the following examples.

Example 1

The slag used in this investigation was provided by Rio Tinto QIT and is sold under the trade name of Sorelslag®. The composition of the slag was discussed above. Hydrogen storage grade magnesium hydride was purchased from Alfa Aesar. MgH$_2$ and slag were mixed in an inert glove box environment to prevent oxidation. A 125% stoichiometric amount of MgH$_2$ was used to ensure complete reaction. The mixture was milled in a SPEX mill for 4 hours using stainless steel balls in a stainless steel jar. The milled mixture was then placed inside a magnesia crucible and a layer of 200% excess MgH$_2$ was placed over the mixture layer to prevent oxidation. A molybdenum cap was placed over the crucible to minimize evaporation of Mg.

The crucible was placed inside a tube furnace and flushed with Ar for at least 30 minutes and H$_2$ gas for 30 minutes prior to the start of the heating program. While still under a steady H$_2$ gas flow at 1 bar pressure, the furnace was heated to 550° C. at a rate of 20° C. per minute and held at 550° C. for 48 hours. The crucible was kept in the hydrogen atmosphere as it cooled. The crucible was removed from the furnace and the top layer of powder was carefully removed. The bottom layer of powder was analyzed using XRD. X-ray diffraction was performed with a Phillips 1140 diffractometer (Cu Kα) and the patterns were analyzed using X'Pert High Score Plus software.

The hydride-MgO mixture was heated to 500° C. and held for 2 hours in a tube furnace with an Ultra-high purity argon atmosphere to dehydrogenate the sample. The sample was allowed to cool, removed, and reanalyzed by XRD. α-Ti peaks are readily apparent. This confirms that the slag can be converted to titanium at much lower temperatures than is currently employed by commercial processes via the magnesium reduction process.

Example 2

The upgraded Ti-slag (UGS) utilized in this investigation was provided by Rio Tinto QIT, which contains 94.5% TiO$_2$, and the main impurities are Fe (1.0%), SiO$_2$ (1.8%), MgO (0.7%) and Al$_2$O$_3$ (0.5%). UGS was milled and screened, and slag with particle size between 25~45 μm was obtained. Hydrogen storage grade magnesium hydride (MgH$_2$) was purchased from Alfa Aesar. MgH$_2$, slag with particular size and MgCl$_2$ salt were mixed in an inert glove box environment to prevent oxidation. A 140% stoichiometric amount of MgH$_2$ was used to ensure complete reaction. The mass ratio of slag to MgCl$_2$ salt was 1:0.5. The mixture was rolled on a roller for at least 30 min to ensure even mixing. The mixture was then placed in an Inconel crucible lined with Mo foil, and a magnesia cap was placed over the crucible to minimize evaporation of Mg.

The crucible was placed inside a tube furnace and purged with high-purity Ar for at least 30 minutes and then high-purity $H_2$ gas for 30 minutes prior to the start of the heating program. Under a steady $H_2$ gas flow at 1 bar pressure, the furnace was heated up to 750° C. at a rate of 10° C./min and held at 750° C. for 6 hours. The furnace was cooled to room temperature in $H_2$ atmosphere, and then the crucible was taken out after turning off $H_2$ gas and purging Ar for 10 minutes.

The reduced powder was leached with dilute HCl solution to remove water-soluble salt and produced MgO. The pH value of the leaching medium was controlled above 1.0. After leaching with stirring at 70° C. for 1 hour, the slurry was separated by a centrifuge. And the remaining solid was washed with high-purity water for three times and dried totally at 60° C.

The solid was analyzed by XRD, SEM and ICP-OES. XRD results confirmed that the major phase in the solid was titanium hydride, and a little bit Ti metal coexisted with $TiH_{1.924}$. Morphology determined by SEM indicated that $TiH_{1.924}$ particles obtained had a relatively large size and its surface showed porous structure. Chemical composition of the solid analyzed by ICP demonstrated that total titanium content increased from 56.7% (for UGS) before reaction to 85.45% as the result of the reduction.

Example 3

To remove the silica and alumina impurities before reduction, sodium hydroxide was used to roast UGS. The mass ratio of NaOH to UGS for roasting was 1.5:1, roasting temperature was 550° C., and roasting time was 1 hour. Sodium titanate was formed by this pretreatment, at the same time, water-soluble sodium silicate and sodium aluminate were formed as well. The roasting solid was washed with water to leach out excess NaOH, Si and Al impurities, also to liberate NaOH combined with titanate and form a washed product that is a derivative of the sodium titanate. By controlling the NaOH concentration in the leachate higher than 200 g/L, more than 80% silica and alumina existed in the UGS could be removed.

The as-produced metatitaniic acid was mixed with $MgH_2$ and $KCl—MgCl_2$ eutectic salt in a similar manner as that in Example 2. A 125% stoichiometric amount of $MgH_2$ was used. The mixed powder was heated at a heating rate of 10° C./min and held at 550° C. for 12 hours. The crucible was kept in the hydrogen atmosphere as it cooled. The crucible was removed from the furnace after purging Ar.

The reduced solid was leached by dilute acid solution, washed, dried and analyzed in a similar manner as Example 2. XRD pattern also confirmed that the major phase remained was titanium hydride ($TiH_{1.924}$). The particle size of $TiH_{1.924}$ was much smaller than that obtained from Example 1, which indicated that the final titanium hydride particle size was affected greatly by the initial particle size of raw Ti-bearing material.

Example 4

In order to get relative pure $TiO_2$ for reduction, NaOH roasting of UGS and purification by hydrolysis of titanium chloride solution was designed. The roasting and water washing conditions were as that in Example 4. The as-produced titanium hydroxide was digested by HCl solution to obtain titanium chloride solution, which then underwent the hydrolysis procedure to obtain pure metatitanic acid. The concentration of HCl solution was 18%, and the hydrolysis happened at a temperature near the boiling point of the solution and lasted for 6 hours.

The obtained titanium hydroxide was mixed with $MgH_2$ and $KCl—MgCl_2$ eutectic salt in a similar manner as that in Example 2. A 150% stoichiometric amount of $MgH_2$ was used. The mixed powder was heated at a heating rate of 10° C./min and held at 500° C. for 6 hours. The crucible was kept in the hydrogen atmosphere as it cooled. The crucible was removed from the furnace after purging Ar.

The reduced solid was leached by dilute acid solution, washed, dried and analyzed in a similar manner as Example 2. XRD pattern confirmed that the major phase remained was also titanium hydride ($TiH_{1.924}$).

Example 5

The upgraded TiO2-slag with the particle size of 25-45 μm was reduced by magnesium/magnesium hydride at 750° C. for 6 h. The product was then leached with acid and dried in vacuum oven. The reduced product was then mixed with $CaH_2$ and $CaCl_2$ in an inert glove box environment to prevent oxidation. A 150% stoichiometric amount of $CaH_2$ was used to ensure complete de-oxidation. 50 wt. % $CaCl_2$ was used as flux. The mixed materials were then heated to 1000° C. and held for 6 h in hydrogen atmosphere. Both heating and cooling rate are 10° C./min. α-Ti with a finite oxygen content were detected in the dehydrogenated one-step reduced sample, while in the de-hydrogenated $CaH_2$ reduced sample, only α-Ti without oxygen content was detected, demonstrating that the further reduction, or deoxygenation, by $CaH_2$ at high temperature was effective. Further, the high temperature treatment and the isothermal holding at the temperature were used to coarsen the particles. With the treatment at 1000 for 6 hours, the average particle size can increase to ~greater than 35 μm. Particle size up to 200 micrometers was obtained. Increasing the isothermal holding time can further increase the particle size.

Example 6

Three specific leaching routes to remove impurities have been tested.

In one embodiment, 1M $NH_4Cl$, 1M sodium citrate, 1M NaOH and 0.6M HCl were used as leaching solutions at 70° C. for 4 h. The leaching begins with a mixture of 1M ammonium chloride and 1M sodium citrate whose primary purpose is to remove MgO, which is the most abundant impurity. This is followed by 1M Sodium Hydroxide and 0.6 M Hydrochloric Acid, which serve to remove the residual oxides. This is a three step process and can successfully remove most of the impurities. Results show the final product contains 98.4% titanium assuming the titanium is in the titanium hydride form.

In another embodiment, 1M $NH_4Cl$, 1M sodium hydrogen phosphate and 0.6M HCl were used as leaching solutions at 70° C. for 4 h.

A second leaching route is only a two-step process. It begins with a mixture of 1M ammonium chloride and sodium phosphate, which serves to complex with MgO and other oxides. This step is followed by a second phase using 0.6 M Hydrochloric Acid, which is intended to extract complexed oxides into the acid solution. This two-step process can successfully remove almost all impurities to achieve a final product purity of 98.4% titanium assuming the titanium is in the titanium hydride form.

In yet another embodiment, another leaching route is to use dilute HCl solutions. HCl solution is so diluted that it does not dissolve the $TiH_2$ particles. However, HCl will react with MgO to remove into the solution. HCl can be added sequentially to leach MgO without dissolving $TiH_2$.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A method for producing a titanium product, comprising:
   obtaining $TiO_2$-slag;
   producing the titanium product from the $TiO_2$-slag using a metallic reducing agent at a moderate temperature under a hydrogen atmosphere at a pressure to directly produce the titanium product chemically separated from metal impurities in the $TiO_2$-slag, wherein the titanium product comprises $TiH_2$ and optionally elemental titanium;
   removing the metal impurities from the titanium product to form a purified titanium product; and
   deoxygenating the titanium product at a higher temperature above the moderate temperature and under hydrogen atmosphere using a second reducing agent which is stronger than the metallic reducing agent to produce a particulate titanium product, coarsening the particulate titanium product to a target particle size range, and cooling the particulate titanium product under a hydrogen atmosphere.

2. The method of claim 1, wherein the step of producing the titanium product includes reducing the $TiO_2$-slag directly with the metallic reducing agent.

3. The method of claim 1, wherein the step of producing includes pre-treating the $TiO_2$-slag to produce intermediate products including at least one of water-washed derivatives of sodium titanate, metatitanic acid, and substantially pure titanium dioxide and then reducing the intermediate products using the metallic reducing agent.

4. The method of claim 1, wherein the metallic reducing agent comprises at least one of Mg, $MgH_2$, and $CaH_2$.

5. The method of claim 1, wherein the producing the titanium product from the $TiO_2$-slag comprises combining the $TiO_2$-slag, the metallic reducing agent, and a salt.

6. The method of claim 5, wherein the salt comprises at least one of a mono-metal chloride salt, binary chloride salt, and a ternary chloride salt.

7. The method of claim 5, wherein the salt comprises at least one of $MgCl_2$+NaCl, $MgCl_2$+KCl, and $MgCl_2$+$CaCl_2$.

8. The method of claim 1, further comprising dehydriding the purified titanium product to form titanium powder.

9. The method of claim 1, further comprising deep-deoxidizing the purified titanium product to reduce residual oxygen in the purified titanium product.

10. The method of claim 1, wherein the moderate temperature is between about 400° C. and about 1200° C.

11. The method of claim 1, wherein obtaining the $TiO_2$-slag comprises carbothermally reducing a titanium feedstock comprising at least one of ilmenite, natural rutile, and leucoxene.

* * * * *